April 27, 1943. W. W. P. STELTER 2,317,822
BAND SNAPPER FOR CORN HUSKING MACHINES
Original Filed Dec. 18, 1936 3 Sheets-Sheet 3
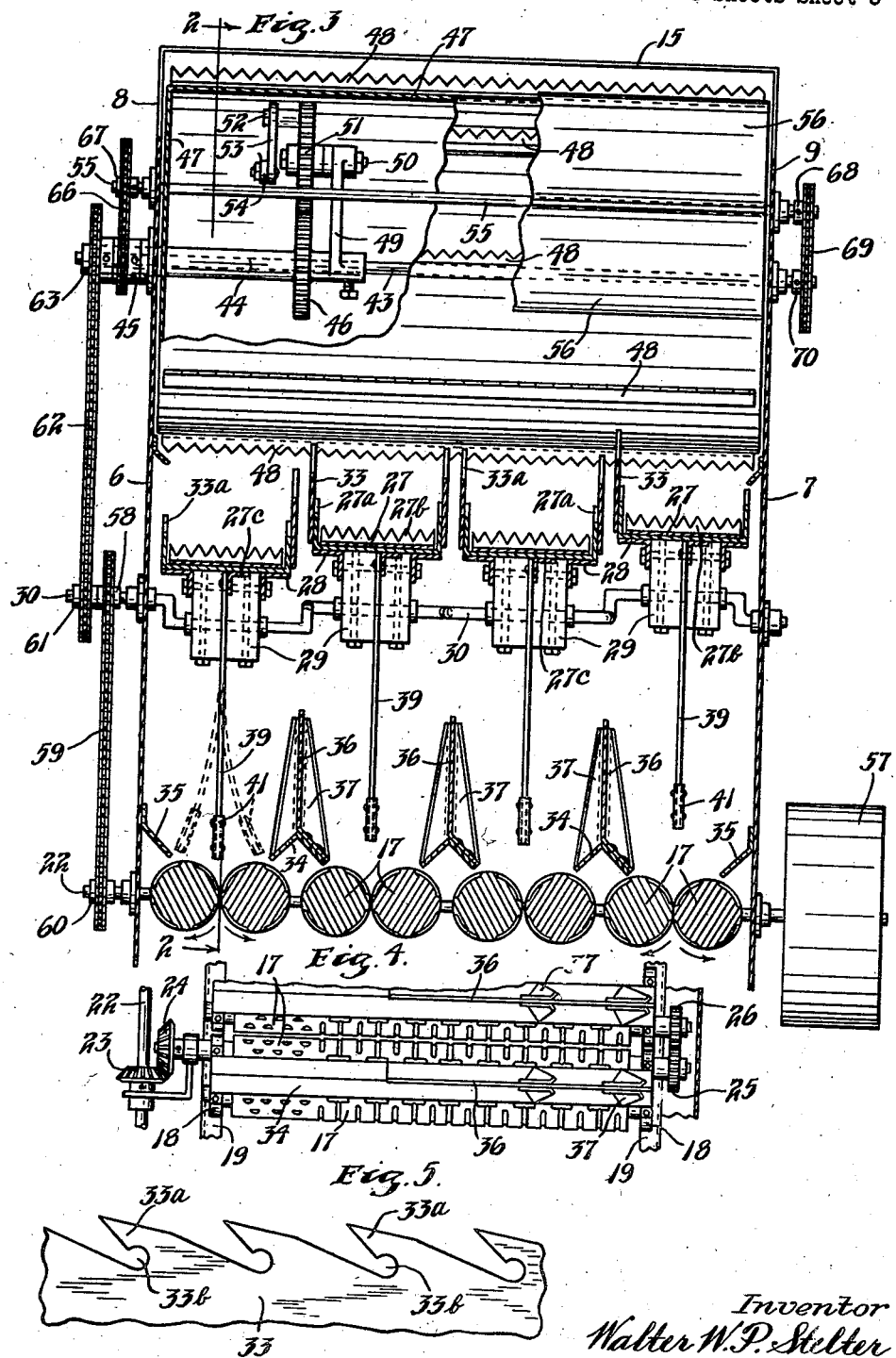
Inventor
Walter W. P. Stelter
By Williamson & Williamson
Attorneys Patented Apr. 27, 1943

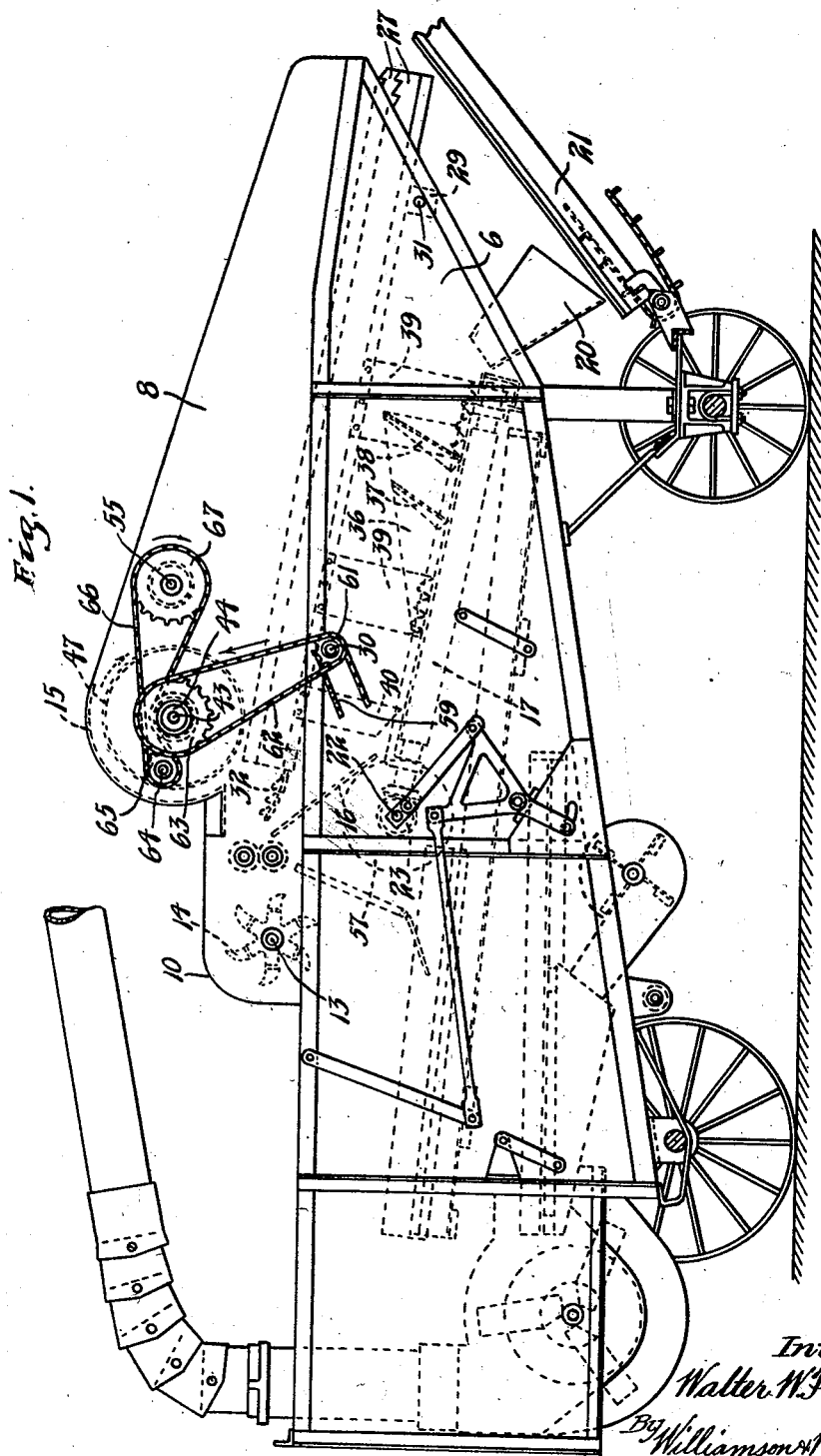

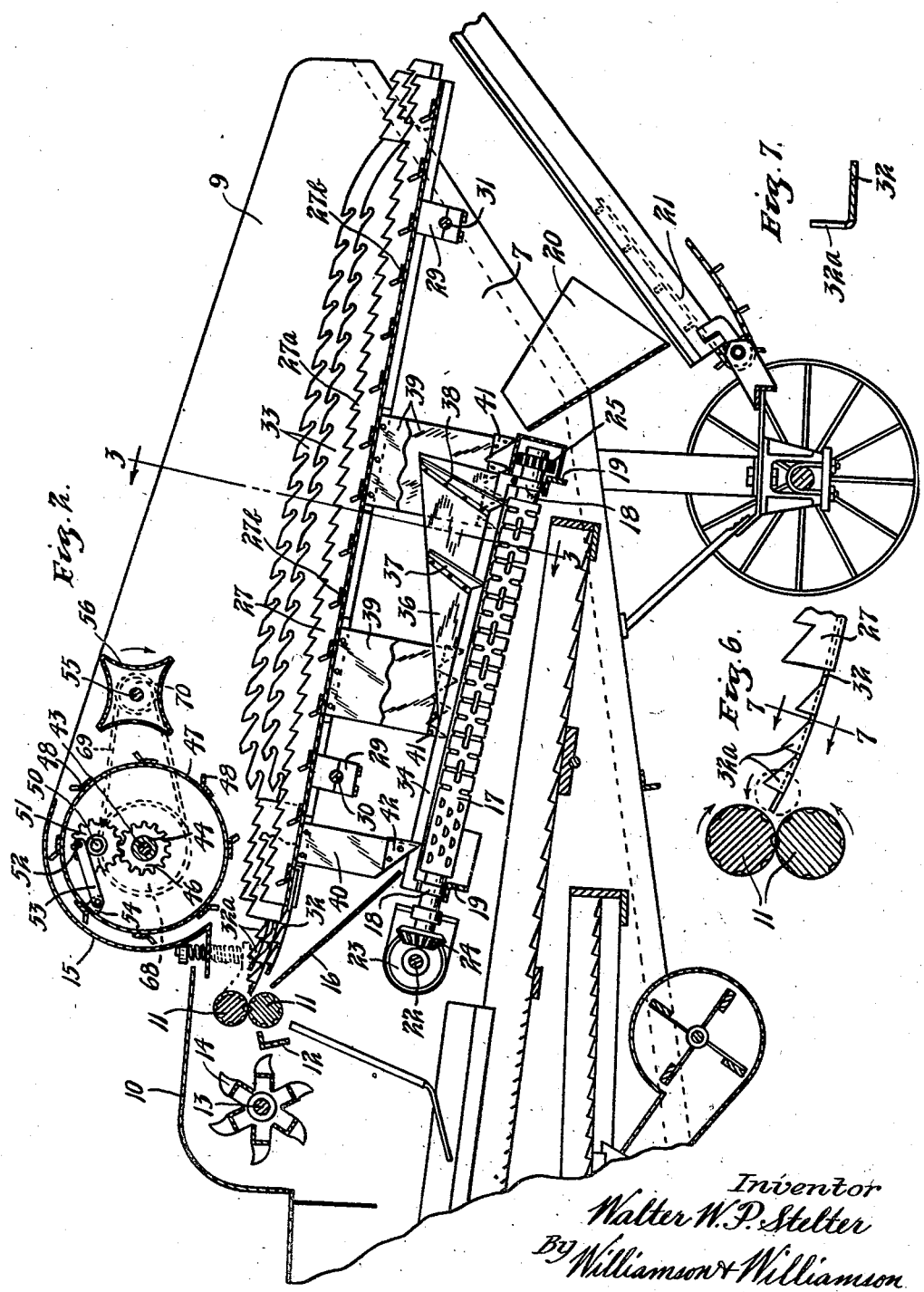

2,317,822

UNITED STATES PATENT OFFICE 2,317,822

BAND SNAPPER FOR CORN HUSKING MACHINES

Walter W. P. Stelter, Echo, Minn.

Original application December 18, 1936, Serial No. 116,593. Divided and this application May 1, 1940, Serial No. 332,733

9 Claims. (Cl. 130—33)

This invention relates to feeders for such machines as corn husking and shredding machines and it relates particularly to means for breaking the cords holding together the bundles of the product fed to such machines.

The present application is a division of the application for patent entitled "Corn husking machine" filed in my name on December 18, 1936, Serial No. 116,593, and allowed November 24, 1939, which matured into Patent No. 2,202,540, issued May 28, 1940, which application Serial No. 116,593 was a continuation in part of the subject matter divided out of an earlier application Serial No. 9,200, filed in my name on March 4, 1936, and entitled "Feeder for corn shredders and the like" which last named application matured into Patent No. 2,085,174 issued June 29, 1937.

It is one of the main objects of the present invention to provide novel and improved band snappers for corn husking and shredding machines and other machines of similar nature to which bundles of products are fed.

Another object is to provide in such machines novel and improved means for snapping the bundle cords, the said means also acting to advance the material as it is fed.

It is more specifically the object of the present invention to provide improvements on my previous inventions disclosed in my United States Patent No. 2,016,910, issued October 8, 1935, entitled "Feeder for corn shredders and the like," and in my United States patent entitled "Feeders for corn shredders and the like," No. 2,085,174, issued June 29, 1937.

The objects and advantages of the invention will more fully appear from the following description made in connection with the accompanying drawings, wherein like reference characters refer to the same or similar parts throughout the various views, and in which Fig. 1 is a view in side elevation illustrating the major portions of a corn husker and shredder embodying the invention;

Fig. 2 is a longitudinal section taken through the machine shown in Fig. 1 on approximately the line 2—2 of Fig. 3, as indicated by the arrows;

Fig. 3 is a section taken on the line 3—3 of Fig. 2, as indicated by the arrows;

Fig. 4 is a plan view looking down on portions of the husking rollers of the machine;

Fig. 5 is a view in enlarged scale of one of the band snappers of the machine;

Fig. 6 is a vertical section on an enlarged scale illustrating the snapping rollers and one of the bridging bars carried by one of the decks of the machine; and Fig. 7 is a section taken on the line 7—7 of Fig. 6, as indicated by the arrows.

Referring to the drawings, the major parts of a combination corn husking and shredding machine are illustrated. The front end of this machine is considered to be the left end of the machine, as viewed in Fig. 1 of the drawings. Inasmuch as the present invention has to do with the mechanism for feeding the material into the snapping rollers of such a machine as is illustrated and it also has to do with the husking mechanism, it will merely be necessary to identify by number a few of the more or less standardized parts of the general machine.

The left side of the machine appearing at the left side of Fig. 3 of the drawings is designated by the numeral 6, while the right side of the machine is designated by the numeral 7. Attached to these sides are upwardly projecting side extensions or wings 8 and 9 respectively, which are not found in the usual machine, and these wings project forwardly from the rear end of the machine and they are cross connected at their forward portions by a curved plate 10 which overlies and closes off the space above the snapping rollers 11, the cutter bar 12 and the cutter head 13 which carries the cutters 14. The upper snapping roller 11 is spring pressed towards the lower snapping roller in the usual manner and the snapping rollers 11 and the cutter 13 extend between and are journaled in the forward portions of the extensions 8 and 9 in the usual relation. Of course the cutter bar 12 also extends between the extensions 8 and 9. Slightly rearwardly from the curved plate 10 the extensions 8 and 9 are additionally cross connected by a curved plate 15 of arcuate shape in cross section and having a forwardly projecting extension at its lower edge. A deck 16 inclines downwardly and rearwardly from adjacent the rear side of the lower snapping roller 11 to deliver the ears of corn snapped off the stalks by the snapping rollers 11 to the receiving ends of a plurality of husking rollers 17. These husking rollers 17 are located considerably below the level of the snapping rollers 11 and are journaled in bearings 18 carried by a pair of cross bars 19 of angular shape, which extend across between the two sides 6 and 7 of the machine. All the rollers 17 are located at the same level in parallel relation and they slant downwardly and rearwardly at rather a gradual inclination from their receiving ends toward their discharge ends. The husked corn is discharged from the husking rollers 17 into a chute 20 which feeds to an elevator 21 for delivery of the corn as into a wagon or the like.

Of course, the husking rollers 17 extend generally longitudinally of the machine and they are arranged in cooperating pairs in the usual manner, the two rollers of each pair rotating in opposite directions to form a bight for the husks therebetween. In the illustrated embodiment, the upper portions of the husking rollers 17 are provided with snapping recesses to secure a secondary snapping action to release any ears that may be carried down with stalks from the snapping rollers 11. A cross shaft 22 extends between and is journaled in the sides 6 and 7 of the machine to extend adjacent the forward ends of the various husking rollers 17 and this shaft carries beveled pinions 23 meshing with beveled gears 24 connected to the forward ends of one of each pair of husking rollers 17. The roller of a pair carrying a gear 24 also carries at its rear end a pinion 25 in mesh with a gear 26 attached to the rear end of the cooperating husking roller 17 of the pair and it will thus be seen that all the rollers 17 are properly driven, as the shaft 22 is rotated.

In accordance with the present invention, a plurality of feed decks 27 are disposed above the husking rollers 17 between the sides 6 and 7 of the machine and to form in reality the bottom of a trough, the sides of which are composed largely of the side extensions 8 and 9. These decks are of channel-shape in transverse cross section with the sides of the decks projecting upwardly and the upper edges of the sides of the decks having forwardly and upwardly projecting teeth 27a formed therein. Attached by angular brackets 28 to the under side of each deck 27 are a pair of longitudinally spaced cap bearings 29. The forward bearings 29 receive within them the crank portions of a forward crank shaft 30 which extends beneath and is journaled in the side walls 6 and 7 of the machine, while similarly the rear bearings 29 receive within them the crank portions of a rear crank shaft 31 which also extends between and is journaled in the sides 6 and 7. The crank portions of the two crank shafts 30 and 31 are similarly formed and set and in the illustrated embodiment each crank shaft has four crank portions for cooperation with the bearings 29 for four decks 27 and the various crank portions of each crank shaft are angularly displaced from adjacent crank portions by 90°. This permits of gyration of each deck 27 as a unit as the forward crank shaft 30 is rotated and it also permits differently timed gyratory motion to be imparted to the several decks.

Extending transversely between the sides of the various decks at longitudinally spaced points are cleats 27b which have upwardly and forwardly projecting teeth extending above the bottoms of the decks. The forward ends of at least certain of the decks 27 are equipped with bridging bars 32 which project to points contiguous to the snapping rollers 11 and as these bridging bars are originally secured to the bottoms of the decks 27, a gyratory movement will be imparted to these bridging bars as the decks are actuated. These bridging bars curve upwardly somewhat from the forward ends of the decks 27 so that when the bridging bars are in their forwardmost position, the forward ends of the bridging bars will extend well into the bight between the two snapping rollers 11, as best shown in Fig. 6. These bridging bars have teeth 32a formed as side flanges thereon and these teeth incline upwardly and forwardly. As shown in dotted lines, Fig. 6, the forward ends of the bridging bars gyrate through the circular path and in the direction indicated. The inner sides of the two outer decks 27 and both sides of the inner decks 27 have attached thereto upwardly projecting cord snapping plates 33. These plates project well above the upper edges of the sides of the decks proper and they have forwardly and upwardly projecting teeth 33a formed at their upper edges. Between adjacent teeth 33a hook-shaped notches 33b are formed, as best shown in Fig. 5 of the drawings. The cord snapping plates 33 extend from adjacent the rear ends of the decks 27 to points spaced slightly rearwardly from the forward ends of the decks, and the upper corners of these plates are preferably rounded as shown in Fig. 2, so as not to interfere with the travel of the material toward the snapping rollers 11. The teeth 33a have hook-shaped notches 33b extending to the forward ends of the cord snapping plates 33.

The various rollers 17 rotate in the directions indicated by the arrows in Fig. 3 and located above the rollers, extending longitudinally of the rollers, and bridging the space between adjacent pairs of rollers as well as the space immediately above the upwardly rotating portions of the two adjacent rollers of adjacent pairs, are guard bars 34 of inverted V-shape in vertical transverse cross section. These guard bars 34 have downwardly and outwardly projecting tabs at their respective ends attached to the bearings 18 for the husking rollers. Other guards 35 are attached to the sides 6 and 7 respectively of the machine to extend longitudinally above the upwardly rotating portions of the outer rollers of the two outermost pairs of rollers 17. Vertical divider plates 36 of right triangular-shape are attached to the guard bars 34 and these divider plates project upwardly from the peaks of the guard bars with the hypothenuses of the triangles slanting diagonally upwardly from points spaced rearwardly from the forward ends of the rollers a distance slightly less than half the length of the rollers. Side wings 37 and 38 respectively have attaching flanges secured to the divider plates 36 and these side wings are of greater width near their lower ends than at their upper ends, they incline upwardly and rearwardly from their lower ends toward their upper ends and they slant out from the divider plates 36, so that their outer edges are more rearwardly disposed than are the edges attached to the divider plates, all as shown in Figs. 2, 3 and 4.

Secured to angular shaped brackets 27c attached to the under sides of the various decks 27 are a number of jostlers 39 and 40. These jostlers are formed of sheet material having some flexibility, such as leather or rubberized belting material, and when the machine is at rest the jostlers lie in substantially vertical planes extending longitudinally of the machine immediately above the bights between cooperating husking rollers 17. In the illustrated embodiment, each deck 27 carries two of the jostlers 39 and one jostler 40, the jostler 40 being attached to the forward portion of a deck and the two jostlers 39 being spaced rearwardly from the jostler 40 and also being spaced from each other. The jostlers 39 have a series of teeth cut in their lower edges and these teeth are capped by metal caps 41 of U-shape in horizontal cross section, the caps being secured in place by rivets or the like. The jostlers 40 have only one tooth at their lower ends, this tooth being capped by a metal cap 42 similarly secured. When the decks 27 are in motion, the jostlers 39 and 40 have a gyratory motion in a vertical plane upwardly, forwardly, downwardly and rearwardly relative to the husking rollers 17 and they also, due to vibratory action, have a swinging movement transversely of the rollers 17, as indicated in dotted lines in Fig. 3.

Journaled in the side extensions 8 and 9 above the forward portions of the decks 27 is a cross shaft 43. A sleeve 44 is journaled in the left side extension 8 on the shaft 43 and secured to this sleeve outwardly from the side extension 8 is a sprocket 45. The sleeve projects inwardly from the side extension 8 and carries near its inner end a pinion 46. Journaled on the sleeve 44 and on the shaft 43 is a retarder drum 47 of hollow cylindrical shape, which extends between the side extensions 8 and 9. This retarder drum carries transverse toothed cleats 48 on its periphery. Fixed to the shaft 43 adjacent the inner end of the sleeve 44 is an arm 49 which has journaled therein at its outer end a stub shaft 50 upon which is mounted a gear 51 meshing with the pinion 46. This gear 51, in turn, carries an eccentrically disposed pin 52 to which one end of a link 53 is pivotally connected. The other end of the link 53 is pivotally connected to a lug 54 attached to the inner side of the retarder drum 47.

Rearwardly disposed from the retarder drum 47 and journaled at a somewhat higher level than the shaft 43 in the side extensions 8 and 9 is a drum shaft 55 to which a drum 56 is secured. The drum 56 extends between the side extensions 8 and 9 and this drum has a number of radial blade-like portions with concave portions joining adjacent blade-like portions.

The shaft 22, although it may be driven from any moving part of the machine, is illustrated in the drawings as carrying at its right end a pulley 57 which may be driven as by a belt, not illustrated, from an engine such as that found on the ordinary farm tractor. The shaft 22 may be driven in a counterclockwise direction, as viewed in Fig. 2. The crank shaft 30 carries adjacent its left end a sprocket 58 over which is trained a sprocket chain 59 and this sprocket chain 59 also works over a sprocket 60 carried at the left end of a shaft 22. Accordingly, the crank shaft 30 will be rotated also in a counterclockwise direction, as viewed in Fig. 2. The rotation of the shaft 30 will impart gyratory movement to the various decks 27, first upwardly then forwardly then downwardly and then rearwardly successively relative to the snapping rollers 11. As bridging bars 32 are rigidly attached to the decks, these bridging bars will have similar movement. Also as the jostlers 39 and 40 are attached to the decks, they will similarly gyrate. Of course the toothed sides of the decks will move with the decks as will the cord snapping decks 33.

The sleeve 44 for the retarder is driven from the crank shaft 30 through the medium of a sprocket 61 attached to the crank shaft, a sprocket chain 62 and a sprocket 63 attached to the left end of the sleeve 44. Accordingly, the sleeve 44 is driven in a counterclockwise direction, as viewed in Fig. 1.

To drive the drum shaft 55 a stub shaft 64 is mounted in the left side extension 8 and this stub shaft carries a sprocket 65. A sprocket chain 66 is trained over the sprocket 65 and a sprocket 67 carried at the left end of the drum shaft 55. The lower run of this sprocket chain 66 also passes over the sprocket 45 attached to sleeve 44 and motion is imparted to the sprocket chain 66 through the medium of the sprocket 45. With this arrangement, it will be seen that the drum shaft 55 will be driven in a clockwise direction, as viewed in Figs. 1 and 2, and that, accordingly, the drum 56 will be driven in a clockwise direction. To drive the retarder shaft 43, drum shaft 55 is equipped at its right end with a sprocket 68 and a sprocket chain 69 is trained over the sprocket 68 and a sprocket 70 carried at the right end of the shaft 43. Accordingly, the shaft 43 is driven in a clockwise direction, as viewed in Figs. 1 and 2.

As the shaft 43 rotates in a clockwise direction, the arm 49 will be similarly rotated but as the sleeve 44 rotates in a counterclockwise direction, the pinion 46 will be rotated in a counterclockwise direction. The gear 51 will, of course, rotate in a clockwise direction, as viewed in Fig. 1. As the arm 49 moves a motion will be transmitted to the retarding drum 47, first through a certain arc in a clockwise direction and thence through a certain arc less than the first mentioned arc in a counterclockwise direction. In other words, the gear 51 which has a planatory movement about the shaft 43, as well as a rotational movement about the axis of the stub shaft 50, will transmit through the link 53 eccentrically connected to the gear 51, first a movement to the retarder drum 47, first in one direction and then in the opposite direction, the movement in the clockwise direction as viewed in Fig. 2, being greater than the movement in the counterclockwise direction.

In operating the machine bundles of corn tied by cord in the usual manner, are thrown onto the decks 27. These decks are all differently timed, so that as one deck moves forwardly, another deck moves downwardly, a third deck moves rearwardly and a fourth deck moves upwardly. The teeth 33a of the cord snapping plates 33 work into the corn so as to catch the cords tying the bundles of corn together in certain of the notches 33b. The differently timed gyratory movement of the decks then causes the cords to be broken after being caught in the notches 33b. The decks, due to their gyrating action spread the bundles of corn longitudinally as well as laterally and advance the corn stalks toward the snapping rollers 11. This advancing action is created very largely by the cord snapping plates 33 which work on the main body of the corn and it is assisted by the transverse toothed cleats 27b which advance the finer and looser material. As the material advances to a point beneath the drum 56, this drum, if the material has built up to a high enough point, acts to compress the material downwardly to a certain extent, while feeding the upper run of the material towards the retarder drum 47. Also this drum 56 acts in conjunction with the forward teeth 33a of the corn snapping plates to cause these teeth to catch into the corn and thereby engage occasional cords which may not have been broken by the more rearwardly disposed teeth to the cord snapping plates. The retarder drum 47 acts on the upper strata of the material, moving towards the snapping rollers 11 to prevent feed of too great quantities of the material to the snapping rollers 11 at one time. The lower portion of the retarder drum 47 moves first through a vertain arc in a forward direction and then through a certain arc less than the first arc in a rearward direction and thus this drum tends to spread out the material lengthwise of the machine and it prevents choking of the material at the point of entry of the material into the bight between the snapping rollers.

The sides of the U-shaped decks 27 as well as the cord snapping plates 33 prevent cords and material from being carried to any appreciable extent between adjacent decks to interfere with the action of the decks. The bridging bars 32 carry the material into contiguity with the bight between the snapping rollers 11 and the forward ends of these bars by reason of their movement, as illustrated in Fig. 6, actually act to push the material into the bight between the snapping rollers.

Of course, the ears of corn are snapped off from the stalks by the snapping rollers 11 and the stalks pass on to the cutter bar 12 and the cutter 13, while the ears in unhusked condition drop down the deck 16 onto the receiving ends of the rollers 17. The guard plates 34 and 35, of course, prevent the ears from moving to points between adjacent pairs of husking rollers and the jostlers 40 and 39, which have both a gyratory movement in a vertical plane as well as a swinging action in a plane transversely of the husking rollers 17, due to the natural vibration of the machine, strike and jostle the ears so as to agitate them and tend to align them anew with the bights between the husking rollers. In other words, the jostlers 39 and 40 give the ears of corn kicks which tend to turn the ears somewhat. In conjunction with the downward movement of the ears by gravity, these kicks imparted to the ears tend to bring the ears more in parallel alignment with the husking rollers 17 and to bring different portions of each ear adjacent the bights of these rollers, so that a much more thorough husking action is secured than would otherwise be obtained without the use of these jostlers 39 and 40. The divider plates 36 separate the ears into different channels after they have had some opportunity through the rotational movement of the husking rollers 17 and the upper jostlers 40 to align with the husking rollers. The wings 37 attached to the divider plates 36 tend to retard the movement of the ears somewhat so that a more thorough husking action can be obtained. Of course, the jostlers 39 and 40, the divider plates 36 and the wings 37 all work together to secure the desired thorough husking action. While the wings 37 tend to retard the ears the jostlers 39 tend to cause the husking rollers to take different holds upon the husks of corn. Of course, the jostlers 39 also assist materially in feeding the loose husks, stalks, etc. into the bight between husking rollers. The teeth at the lower edges of the jostlers 39 and 40 are provided with caps 41 and 42 respectively, to prevent undue wear upon these teeth. The flexibility of the material forming the jostlers permits the vibration of the machine to give the jostlers the side swinging motion transversely of the rollers 17 above referred to.

It will be seen that an efficient feeding and husking action is secured in a simple manner in accordance with the present invention and that an extremely effective cord snapping action is obtained as the material is fed. While the invention is described in connection with corn husking and shredding machines, it will be understood that it is not limited to such machines alone, inasmuch as the principles of the invention may be applied to the other machines.

It will, of course, be understood that various changes may be made in the form, details, arrangement and proportions of the various parts without departure from the scope of the present invention, which generally stated, consists in the matter shown and described and set forth in the appended claims.

What is claimed is:

1. In a machine such as a corn shredder having oppositely acting rollers between which material is to be fed, feeding means operating beneath said material for feeding material forwardly to said rollers, a material engaging member mounted above said feeding means adjacent said rollers for rotation about an axis extending transversely of said feeding means, means imparting in repeated fixed cycles intermittent rotational movement to said material engaging member, first through a certain arc in one direction and thence through a certain arc less than said first mentioned arc in the opposite direction whereby said material engaging member will act on the upper strata of the fed material to retard movement of the upper strata relative to the lower strata and a rotating drum having radial spaced feeding projections, said drum being disposed behind said material engaging member above said feeding means and rotating about an axis parallel to the axis of rotation of said material engaging members and having its lower edge rotating forwardly.

2. In a machine such as a corn shredder having oppositely acting rollers between which material is to be fed, feeding means operating beneath said material for feeding material forward to said rollers, a material engaging member mounted above said feeding means adjacent said rollers for rotation about an axis extending transversely of said feeding means, means imparting intermittent rotational movement to said material engaging member whereby said material engaging member will act on the upper strata of the fed material to retard movement of the upper strata relative to the lower strata, and a rotating drum having radial, spaced feeding projections thereon and so rotating that its lower edge moves forwardly and disposed behind said material engaging member above the lower edge of the same and above said feeding means and pressing high runs of material downwardly to said material engaging member to prevent such high runs from traveling over said material engaging member.

3. A combined feeder and cord snapper for corn shredder and analogous machines having oppositely acting snapping rollers, said feeder and cord snapper comprising a plurality of decks over which the material is fed and a plurality of differently timed gyrating members projecting upwardly from said decks and terminating at their upper edges in a multiplicity of teeth, the forward edges of which teeth are notched rearwardly below the upper tips of the teeth to form hooking notches for catching corded bundles advanced over the decks.

4. In a machine such as a corn shredder to which corded bundles of material are fed, said machine having oppositely acting rollers between which the material is fed, means for conveying material forwardly over the same to said rollers and grab hooking means working above said first mentioned means and gyrating about axes extending transversely relative to the general direction of movement of the material for digging into corded bundles advanced by said means and hooking onto, holding and breaking the cords on such bundles.

5. In a machine such as a corn shredder to which corded bundles of material are fed, said machine having oppositely acting rollers between which the material is fed, means for conveying material forwardly over the same to said rollers, a bar located above said means, means for gyrating said bar about an axis taken transversely of the general direction of movement of the material and a multiplicity of upwardly notched grab hooks carried by said bar adjacent the upper edge thereof for digging into corded bundles advanced by said means and grabbing, holding and breaking the cords on such bundles.

6. In a machine such as a corn shredder to which corded bundles of material are fed, said machine having oppositely acting rollers between which the material is fed, means for conveying material forwardly over the top thereof to said rollers, a plurality of bars projecting above said means, means for imparting differently time gyrating movement to said bars such gyrating movement taking place about axes extending transversely of the general direction of movement of said material and a multiplicity of upwardly notched grab hooks carried by each bar adjacent the upper edge thereof, the hooks on the different bars cooperating to work into corded bundles conveyed by said means and to catch, hold and break the cords on such bundles.

7. In a machine such as a corn shredder to which corded bundles of the material are fed, said machine having oppositely acting rollers between which the material is fed, a plurality of differently timed gyrating decks conveying material forwardly over the tops thereof to said rollers, said decks gyrating about axes extending transversely of the general direction of movement of said material, bars carried by said decks and projecting above the same and a multiplicity of upwardly notched grab hooks carried by each bar adjacent the upper edge thereof said hooks being adapted to work into corded bundles advanced by said decks and to grab, hold and break the cords on such bundles.

8. The structure defined in claim 4 and a compressor working above said conveying means and cooperating therewith to force bundles downwardly to be engaged by said hooking means.

9. In a machine such as a corn shredder to which corded bundles of material are fed, said machine having oppositely acting rollers between which the material is fed, means for conveying material forwardly over the top of the same to said rollers and grab hooks working above said means and gyrating about axes taken transversely of the general direction of movement of the material, each grab hook including a bundle penetrating and cord catching finger and a notched portion the notch in which extends from a point below the lowermost part of the finger to a point above the lowermost part of the finger whereby during the movement of said grab hooks the fingers thereof will dig into corded bundles of material being advanced by said conveying means to hook onto the cords thereof and force the cords into said notched portions and during another part of the movement of said grab hooks the cords held within the notches of said notched portions will be temporarily retained within the notches by said fingers against the direction of travel of the corded bundles and the cords will be thus broken.

WALTER W. P. STELTER.